Dec. 6, 1955 A. M. HOWALD 2,726,185
METHOD OF FORMING TAPERED GLASS RODS
Filed April 26, 1952

INVENTOR
ARTHUR M. HOWALD
BY
Kenyon & Kenyon
ATTORNEY

United States Patent Office 2,726,185
Patented Dec. 6, 1955

2,726,185

METHOD OF FORMING TAPERED GLASS RODS

Arthur M. Howald, Perrysburg, Ohio

Application April 26, 1952, Serial No. 284,617

8 Claims. (Cl. 154—91)

This invention relates to the manufacture of glass rods such as fishing rods and to fabrics which may be employed in the manufacture of such rods or in the manufacture of other molded products.

Heretofore rods such as fishing rods have been manufactured employing glass fibres which extend longitudinally of the rod and serve as tension members. This manufacture has generally been accomplished by assembling individual slivers or strands of glass fibres into the form of the final rod. These fibres are coated with a suitable material prior to formation into the rod. Thereafter the rod is wrapped in a suitable material such as cellophane, and the plastic material is cured to produce the finished article.

Such rods are particularly advantageous because they are light in weight and extremely flexible, strong and resilient. They are light in weight because substantially all fibres which do not extend axially of the rod to serve as tension or compression members are eliminated. However, the above-described method of assembling the individual slivers or strands of fibres to form the final rod is an expensive manufacturing procedure.

One object of the present invention is to provide a new and improved method of making such rods.

Another object is to provide a method which eliminates the step of assembling the individual slivers or fibres to form a tapered rod, thus reducing manufacturing and labor costs and simplifying the manufacture while giving the desired tapered rod.

Another object is to provide a cloth made of fiberglas which is suitably for making rods of the type described.

Another object is to provide such a cloth in which the glass fibers are substantially all disposed in parallel relation and are bound together by a suitable resin which can be cured or hardened to its final stage in the completed rod.

Another object is to provide such a cloth in which there are no interlaced cross strands such as are required in weaving and which add weight without commensurate tension or compression strength axially of the rod and which furthermore tend to displace the axially-extending strands from a straight axial path.

Another object is to provide such a cloth which may be used for other molding than the formation of rods and which can be easily molded to various irregular shapes prior to final curing of the resin.

For the purpose of illustrating the invention, there are shown in the accompanying drawings forms thereof which are at present preferred since they have been found to give satisfactory and reliable results, although it is to be understood that the various instrumentalities of which the invention consists can be variously arranged and organized and that the invention is not limited to the processes, arrangements and organizations of the instrumentalities as herein shown and described.

Figure 1:
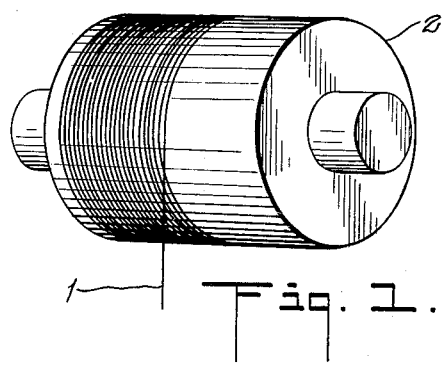
Fig. 1 is a view showing a suitable drum for use in forming the fabric which is employed in making the rod.

In general the invention consists in forming a cloth of glass fibres. These fibres have a diameter of approximately 200 microinches and a tensile strength of approximately 300,000 pounds per square inch. These fibres are coated with a suitable flexible resin which is latently hardenable. The fibres are arranged in parallel relation to form a sheet. They are bound together by a resin, which is sufficiently flexible to give the sheet the flexibility and workability of cloth. Thereafter the cloth is cut to the desired shape and it is then wrapped to form a rod with the fibres extending axially of the rod. Thereafter the resin is cured or hardened to its final stage.

A suitable resin may be one which may exist in a liquid stage commonly referred to as the "A-stage" and which may, after partial curing, assume a flexible stage known as the "B-stage," and which on further curing may assume a final hard stage commonly referred to as the "C-stage." When such a resin is employed the fibres are coated with the resin in its A-stage. The sheet is then formed and the resin is partially cured to carry it to the B-stage where it binds the fibres together in a flexible sheet of cloth. The rod is then formed and the resin is cured to the final hard stage or the C-stage.

One may also employ a latently hardenable resin which has the necessary physical consistency to serve as a binder and to form a flexible cloth, which resin may be dissolved in a suitable solvent and then applied to the fibres which are then laid in parallel relationship to form the sheet, after which the solvent is eliminated leaving the sheet of fibres bound together by the flexible resin. The cloth thus formed is then fashioned into the final desired form and the resin is cured to its hard stage.

It is also possible to use a resin having the desirable physical characteristics for forming a sheet of cloth. This resin may be softened by heating to a liquid or semi-liquid condition and then applied to the strands, which are then formed into the cloth. Thereafter the resin is cooled giving the final cloth. This resin must be latently hardenable but may be one which is not hardened to its final hardness without an application of heat either of greater extent or for longer duration than is necessary to soften the resin to permit its application to the fibres.

In the preferred method of carrying out the invention, a continuous sliver or strand of glass fibres 1, which is made up of a plurality of individual fibres, is wound in contiguous turns on the surface of a drum 2. Prior to winding the glass fibres they are coated with the resin which will bind them together in the flexible cloth. The resin may be a resin in the liquid or A-stage or it may be a solution of resin having the desired physical characteristics.

When the drum is covered by a layer of the fibres thus wound on the drum, the resin if it is an A-stage resin, is cured to the B-stage, or if the resin is in the form of a solution, sufficient heat is applied to drive the solvent off, thus forming the cloth.

Figure 2:
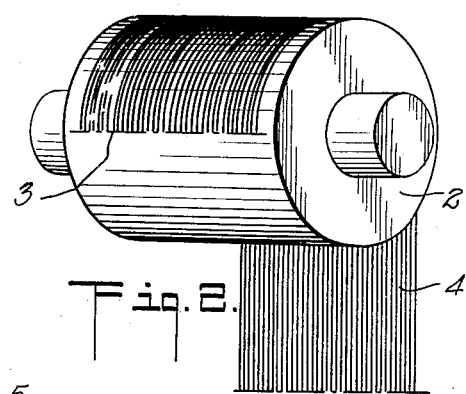
Fig. 2 is a view showing a step in the manufacture of the fabric on the drum.
Figure 3:
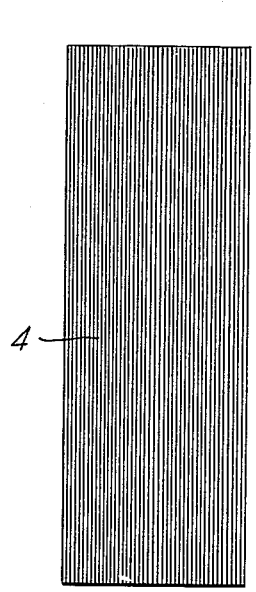
Fig. 3 is a view of the fabric itself.
Figure 4:
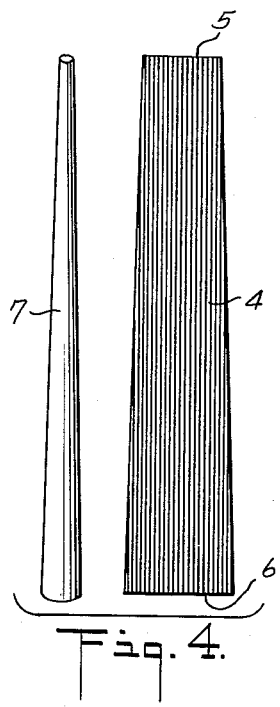
Fig. 4 is a view showing the first step in the manufacture of a stick making use of this fabric.

Thereafter the cloth is severed on a line extending parallel to the axis of the drum as shown at 3 in Fig. 2. This cloth consists of a plurality of glass fibres each extending substantially parallel to the others and each bonded to adjacent fibres with a flexible, latently hardenable resin, which may be a resin in the B-stage or one of the formation resins which has the desired solubility and physical characteristics to give a flexible cloth.

In the preferred form of the invention, about 30 parts by weight of resin are employed for each 70 parts by weight of glass fibres. This amount of resin serves to bind the fibres together satisfactorily in the finished product without adding excessive weight, thus giving a strong, resilient, elastic final product. The fabric may be easily wrapped around a tapered form or core to form a rod. It may also be wrapped around other forms prior to curing to the final hard stage. It is flexible and has considerable strength. It can be stretched in a direction transverse of the fibres without tearing. It thus lends itself well to forming both into rods or into irregular forms.

When the fabric is placed around an irregular form, the cloth may be stretched at points of large diameter and will form an even, smooth coating, while it is reduced at points of less diameter. This gives an even covering even on irregular surfaces.

Figure 5:
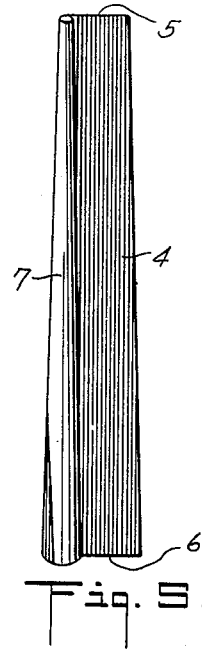
Fig. 5 is a view showing a further step in the manufacture of the stick.
Figure 6:
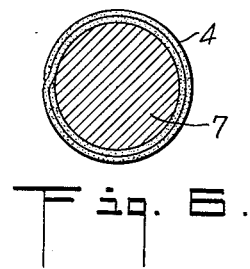
Fig. 6 is a sectional view through a rod formed in accordance with the invention.

When the fabric is to be used in connection with a rod such as a fishing rod, it is disposed with its fibres extending axially and is wrapped to form the rod. In the preferred method of carrying out the invention the fabric, which is indicated at 4, is cut in tapered form with the taper extending in the same direction as the fibres. One end 5 is narrower than the other end 6. The effects of this taper is to provide some fibres shorter than others in the piece of cloth, giving the desired taper when the fabric is wrapped around a core 7 as indicated in Fig. 5.

This core may be formed of balsa wood or any suitable material, since it does not contribute materially to the strength of the final rod.

After the fabric has been wrapped around the core, the fabric and core may be wrapped in a cellophane cover and the resin may then be cured to the final hard stage. In the case of the resin which is curable to the C-stage, this means curing to the C-stage.

Figure 7:
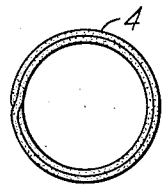
Fig. 7 is a sectional view through another form of rod formed in accordance with the invention.

Instead of using a core 7, the fabric may be wrapped around a mandrel and cured and the mandrel then removed, giving a hollow rod or tube such as is shown in Fig. 7.

Figure 8:
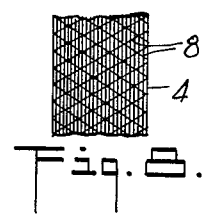
Fig. 8 is a view of a different form of cloth made in accordance with the invention.

In some cases it may be desirable to provide some reinforcement extending transversely of the main group of fibres. This may be accomplished as shown in Fig. 8 by spirally-wound strands or slivers 8 around the drum to give the lateral reinforcement. This cloth may then be used in forming rods or in other ways. The strands 8 are, of course, coated with the resin either in the A-stage or in solution, as above described. The strands are then applied to the other fibres either when they have the A-stage resin thereon or when they are coated with the solution of resin.

When the resin is cured, the strands 8 are bound to the other strands and, of course, in the final product are bound integrally into the rod by the resin when it has been cured to the final hard stage.

In carrying out this invention practically any early-stage latently hardenable phenolic, melamine or similar condensation-type resin may be employed. The resin, of course, must be cured to a form having the desired characteristics for producing a cloth. It may be desirable to use a plasticizer before using any particular resin.

Suitable polyester resins made by heating maleic anhydride and ethylene glycol in equal molar proportions may be employed. The original esterification of said resins must be carried out in an inert atmosphere such as carbon dioxide at a temperature of about 220° C. Such a resin may be mixed with about 20% of a polymerizable liquid such as diallyl phthalate. Such a resin when cured to an asphalt-like consistency is satisfactory for a binder in carrying out the present invention.

The present invention may be embodied in specific forms other than those above described without departing from the spirit or essential attributes of the invention, and it is therefore desired that the present embodiments be considered in all respects as illustrative and not restrictive, reference being had to the appended claims rather than to the foregoing description to indicate the scope of the invention.

What is claimed is:

1. The method of forming a rod having a plurality of glass fibre tension members all extending substantially axially and in close proximity to other such tension members on oposite sides thereof consisting of coating glass fibres with a flexible latently hardenable resin adhesive, disposing said fibres in contiguous, parallel relation to form a continuous flexible sheet with the fibres closely spaced to adjacent fibres on either side thereof and secured to one another by said hardenable resin adhesive, forming said sheet into a rod with the fibres extending axially thereof by wrapping said sheet in contiguous layers and curing said resin to its hard stage.

2. The method of forming a rod having a plurality of glass fibre tension members all extending substantially axially and in close proximity to other such tension members on opposite sides thereof consisting of forming a cloth consisting of a plurality of glass fibres each lying adjacent to similar fibres on either side thereof and extending substantially parallel to the others and coated with and bonded to adjacent fibres with a flexible, latently hardenable resin with the fibres in a ratio of 70 parts by weight of fibres to 30 parts by weight of resin, forming said cloth into a rod with the fibres extending axially thereof by wrapping said cloth in contiguous layers and curing said resin to its hard stage.

3. The method of forming a rod having a plurality of glass fibre tension members all extending substantially axially and in close proximity to other such tension members on opposite sides thereof consisting of forming a cloth consisting of a plurality of glass fibres each lying adjacent to similar fibres on either side thereof and extending substantially parallel to the others and coated with and bonded to adjacent fibres with a flexible, latently hardenable resin, forming said cloth into a rod with the fibres extending axially thereof by wrapping said cloth in contiguous layers and curing said resin to its hard stage.

4. The method of forming a tapered rod having a plurality of glass fibre tension members forming the surface thereof and all extending substantially axially consisting of forming a cloth comprising a plurality of glass fibres each extending with similar fibres on each side thereof and substantially parallel to the others and coated with and bonded to adjacent fibres with a B-stage resin, cutting said cloth to tapered form with the taper extending in the direction of the glass fibres and wrapping said cloth in contiguous layers with the fibres extending axially and curing said resin to its C-stage.

5. The method of forming a rod having a plurality of glass fibre tension members all extending substantially axially consisting of coating glass fibres with an A-stage resin, disposing said fibres in contiguous, parallel relation to form a continuous sheet of said fibres in closely spaced relationship to one another, curing the resin to its B-stage whereby said fibres are secured to one another by said resin, forming said sheet into a rod with the fibres extending axially thereof by wrapping said sheet in contiguous layers and curing said resin to its C-stage.

6. The method of forming a rod having a plurality of glass fibre tension members all extending substantially axially consisting of forming a cloth consisting of a plurality of glass fibres each extending directly adjacent similar glass fibres on both sides thereof and substantially parallel to the others and coated with and bonded to adjacent fibres with a B-stage resin with the fibres in a ratio of 70 parts by weight of fibres to 30 parts by weight of resin, forming said cloth into a rod with the fibres extending axially thereof by wrapping said cloth in contiguous layers and curing said resin to its C-stage.

7. The method of forming a rod having a plurality of glass fibre tension members all extending substantially axially consisting of forming a cloth consisting of a plurality of glass fibres each extending directly adjacent similar glass fibres on both sides thereof substantially parallel to the others and coated with and bonded to adjacent fibres with a B-stage resin, forming said cloth into a rod with the fibres extending axially thereof by wrapping said cloth in contiguous layers and curing said resin to its C-stage.

8. The method of forming a tapered rod having a surface consisting of a plurality of glass fibre tension members, all extending substantially axially of said rod and disposed closely adjacent one another and secured together by a flexible resin consisting of forming a cloth consisting of a plurality of glass fibres, each extending substantially parallel to the others and coated with and bonded to adjacent fibres with a latently hardenable flexible resin, cutting said cloth to tapered form, with the taper extending in the direction of the glass fibres and wrapping said cloth in contiguous layers with the fibres extending axially and curing said resin to its hard stage.

References Cited in the file of this patent

UNITED STATES PATENTS

| | | |
|---|---|---|
| 1,070,455 | Gruber | Aug. 19, 1913 |
| 1,608,102 | Jury | Nov. 23, 1926 |
| 1,834,556 | Toles | Dec. 1, 1931 |
| 2,015,006 | Ekisler | Sept. 17, 1935 |
| 2,131,024 | Cordts | Sept. 27, 1938 |
| 2,429,397 | Compton | Oct. 21, 1947 |
| 2,558,855 | Knewstubb et al. | July 3, 1951 |
| 2,571,692 | Dubois | Oct. 16, 1951 |
| 2,572,407 | Talet et al. | Oct. 23, 1951 |
| 2,602,766 | Francis | July 8, 1952 |
| 2,664,374 | Slayter et al. | Dec. 29, 1953 |

FOREIGN PATENTS

| | | |
|---|---|---|
| 13,430 | Great Britain | 1908 |